(12) United States Patent
Aramoto et al.

(10) Patent No.: US 11,267,122 B2
(45) Date of Patent: Mar. 8, 2022

(54) ROBOT CONTROL DEVICE, ROBOT SYSTEM, AND METHOD OF CONTROLLING ROBOT

(71) Applicant: KAWASAKI JUKOGYO KABUSHIKI KAISHA, Kobe (JP)

(72) Inventors: Masao Aramoto, Akashi (JP); Atsushi Kameyama, Kakogawa (JP); Tomoya Inoue, Osaka (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 166 days.

(21) Appl. No.: 16/485,739

(22) PCT Filed: Feb. 9, 2018

(86) PCT No.: PCT/JP2018/004701
§ 371 (c)(1),
(2) Date: Aug. 13, 2019

(87) PCT Pub. No.: WO2018/147436
PCT Pub. Date: Aug. 16, 2018

(65) Prior Publication Data
US 2019/0366547 A1    Dec. 5, 2019

(30) Foreign Application Priority Data
Feb. 13, 2017  (JP) .............................. JP2017-024381

(51) Int. Cl.
*B25J 9/16* (2006.01)
*G05B 19/4155* (2006.01)
*G05B 19/4067* (2006.01)

(52) U.S. Cl.
CPC ........... *B25J 9/1674* (2013.01); *B25J 9/1661* (2013.01); *G05B 19/4155* (2013.01); *G05B 19/4067* (2013.01); *G05B 2219/40392* (2013.01)

(58) Field of Classification Search
CPC ........ B25J 9/1674; B25J 9/1661; B25J 19/06; G05B 19/4155; G05B 2219/40392;
(Continued)

(56) References Cited

U.S. PATENT DOCUMENTS

2014/0074286 A1    3/2014  Geheb et al.
2016/0077510 A1*   3/2016  Kim .................. G05B 23/0227
                                                    700/79
(Continued)

FOREIGN PATENT DOCUMENTS

DE    10 2013 109 823 A1    3/2014
DE    10 2016 001 967 A1    9/2016
(Continued)

*Primary Examiner* — Khoi H Tran
*Assistant Examiner* — Tanner L Cullen
(74) *Attorney, Agent, or Firm* — Oliff PLC

(57) ABSTRACT

A robot control device configured to control a robot includes a first memory part configured to store work data, a second memory part configured to store restoring data, a calculating part configured to perform an operation instructing process configured to read the work data and generate an operating instruction to the robot, and a data evacuation process configured to determine whether the operation instructing process operates normally, and when the calculating part determines that the operation instructing process does not operate normally, coincide the restoring data with the work data, and an operation controlling part configured to control operation of the robot based on the operating instruction.

14 Claims, 6 Drawing Sheets

(58) Field of Classification Search
CPC ........... G05B 2219/36545; G05B 2219/36548;
G05B 2219/34474; G05B 19/4067; G05B
19/4062; G05B 19/406
See application file for complete search history.

(56) References Cited

U.S. PATENT DOCUMENTS

| | | | |
|---|---|---|---|
| 2016/0118915 A1* | 4/2016 | Sawada | .................. H02J 9/061 |
| | | | 318/5 |
| 2016/0250750 A1 | 9/2016 | Kuroshita | |
| 2016/0279794 A1* | 9/2016 | Inagaki | .................. B25J 9/1674 |
| 2017/0039742 A1* | 2/2017 | Williams | .................. G06T 7/97 |
| 2017/0212507 A1* | 7/2017 | Naito | ............... G05B 19/41865 |
| 2018/0150051 A1 | 5/2018 | Kobayashi | |
| 2020/0047344 A1* | 2/2020 | Kinugasa | ............... B25J 9/1694 |

FOREIGN PATENT DOCUMENTS

| | | | | |
|---|---|---|---|---|
| DE | 11 2016 002 853 B4 | 4/2019 | | |
| EP | 1 935 578 B1 | 1/2012 | | |
| JP | H11-045105 A | 2/1999 | | |
| JP | H1145105 A * | 2/1999 | ............ | G05B 19/18 |
| JP | 2006-260434 A | 9/2006 | | |
| JP | 4504769 B2 | 7/2010 | | |
| JP | 2011-083835 A | 4/2011 | | |
| JP | 2011083835 A * | 4/2011 | ............ | B25J 13/00 |
| JP | 2014-104561 A | 6/2014 | | |
| JP | 2014213400 A * | 11/2014 | ............ | B25J 19/06 |
| KR | 19950012065 B1 | 10/1995 | | |

* cited by examiner

ROBOT CONTROL DEVICE, ROBOT SYSTEM, AND METHOD OF CONTROLLING ROBOT

TECHNICAL FIELD

The present disclosure relates to a robot control device, a robot system, and a method of controlling a robot.

BACKGROUND ART

Conventionally, a robot control device which controls a robot is known (for example, see Patent Document 1).

This robot control device includes an operation instructing part having a data read/write part and a data storing part. Thus, when an abnormality, such as a disconnection of a power source, occurs, the data read/write part writes and stores an operating state and various data of the operation instructing part in the data storing part. This can prevent the operating state and the various data of the operation instructing part from being damaged.

REFERENCE DOCUMENT OF CONVENTIONAL ART

Patent Document

[Patent Document 1] JP2011-83835A

DESCRIPTION OF THE DISCLOSURE

Problems to be Solved by the Disclosure

However, in the robot control device disclosed in the Patent Document 1, if the operation instructing part is suspended due to an error of a program etc., the data read/write part cannot write and store the operating state and the various data of the operation instructing part in the data storing part. Therefore, there is a problem that data may be lost.

SUMMARY OF THE DISCLOSURE

In order to solve the problem, a robot control device according to one aspect of the present disclosure is a robot control device configured to control a robot. The device includes a first memory part configured to store work data, a second memory part configured to store restoring data, a calculating part configured to perform an operation instructing process configured to read the work data and generate an operating instruction to the robot, and a data evacuation process configured to determine whether the operation instructing process operates normally, and when the calculating part determines that the operation instructing process does not operate normally, coincide the restoring data with the work data, and an operation controlling part configured to control operation of the robot based on the operating instruction.

According to this configuration, even if the operation instructing process does not operate normally, damages to the data related to the control of the robot can be prevented. Therefore, the work of the robot can be resumed quickly.

The operation instructing process may include a first normal operation signal outputting module configured to output a first normal operation signal when the process operates normally, and suspend the output of the first normal operation signal when the process does not operate normally. The data evacuation process may determine that the operation instructing process does not operate normally when the output of the first normal operation signal of the operation instructing process is suspended.

According to this configuration, whether the operation instructing process operates normally can be monitored by the data evacuation process.

The first normal operation signal may be a counter reset signal. The robot control device may further include an operation instructing process watchdog timer configured to output a time-over signal when the first normal operation signal is not inputted within a given first cycle time. The operation instructing process may output the first normal operation signal to the operation instructing process watchdog timer at a second cycle time less than the first cycle time. The data evacuation process may determine that the operation instructing process does not operate normally when the operation instructing process watchdog timer outputs the time-over signal.

According to this configuration, whether the operation instructing process operates normally can be monitored by the data evacuation process.

The data evacuation process may inquire a computer operating system whether the operation instructing process operates normally to determine whether the operation instructing process operates normally.

According to this configuration, whether the operation instructing process operates normally can be monitored by the data evacuation process.

The operation instructing process may determine whether the data evacuation process operates normally, and when the operation instructing process determines that the data evacuation process does not operate normally, the operation instructing process may coincide the restoring data with the work data.

According to this configuration, the damages to the data related to the control of the robot can be prevented.

The data evacuation process may include a second normal operation signal outputting module configured to output a second normal operation signal when the process operates normally, and suspend the output of the second normal operation signal when the process does not operate normally. The operation instructing process may determine that the data evacuation process does not operate normally when the output of the second normal operation signal of the data evacuation process is suspended.

According to this configuration, whether the data evacuation process operates normally can be monitored by the operation instructing process.

The second normal operation signal may be a counter reset signal. The robot control device may further include a data evacuation process watchdog timer configured to output a time-over signal when the second normal operation signal is not inputted within a given third cycle time. The data evacuation process may output the second normal operation signal to the data evacuation process watchdog timer at a fourth cycle time less than the third cycle time. The operation instructing process may determine that the data evacuation process does not operate normally when the data evacuation process watchdog timer outputs the time-over signal.

According to this configuration, whether the data evacuation process operates normally can be monitored by the operation instructing process.

The operation instructing process may inquire the computer operating system whether the data evacuation process operates normally, and determine whether the data evacuation process operates normally.

According to this configuration, whether the data evacuation process operates normally can be monitored by the operation instructing process.

The operation instructing process may further write an operating state of the robot in the work data to store the operating state in the first memory part.

According to this configuration, it can be prevented that the work data is lost, which includes the operating state of the robot generated according to the robot operation.

The first memory part may be a volatile medium, and the second memory part may be a nonvolatile medium.

According to this configuration, even if the user necessarily restarts the robot control device, for example, under a situation where the user cannot save a backup of the data stored in the first memory part, the damages to the data related to the control of the robot can be prevented.

The robot control device may include an electric power converting part configured to convert inputted electric power of the primary power source and supply the power to the operation controlling part and the calculating part, and a primary power source voltage drop detecting part configured to detect the a voltage of the primary power source becomes below a given voltage. When the primary power source voltage drop detecting part detects that the voltage of the primary power source becomes below the voltage, at least one of the operation instructing process and the data evacuation process may coincide the restoring data with the work data.

According to this configuration, the damages to the data related to the control of the robot can be prevented even if a problem occurs in the supply of electric power due to a power failure etc.

The robot control device may further include an emergency power source configured to supply electric power to the electric power converting part. When the primary power source voltage drop detecting part detects that the voltage of the primary power source becomes below the given voltage, the electric power converting part may convert inputted electric power of the emergency power source, and supply the power to the operation controlling part and the calculating part.

According to this configuration, the damages to the data related to the control of the robot can be prevented even if the supply of the electric power from the primary power source is stopped suddenly.

The work data may be stored in a storage area shared by the operation instructing process and the data evacuation process.

According to this configuration, the work data can appropriately be managed.

In order to solve the problem, a robot system according to another aspect of the present disclosure includes a robot and the robot control device configured to control the robot.

According to this configuration, even if the operation instructing process does not operate normally, damages to the data related to the control of the robot can be prevented.

In order to solve the problem, a method of controlling a robot according to still another aspect of the present disclosure is a method of controlling a robot by a robot control device. The robot control device includes a first memory part configured to store work data, a second memory part configured to store restoring data, a calculating part configured to perform an operation instructing process configured to read the work data and generate an operating instruction to the robot, and a data evacuation process configured to determine whether the operation instructing process operates normally, and when the calculating part determines that the operation instructing process does not operate normally, coincide the restoring data with the work data, and an operation controlling part configured to control operation of the robot based on the operating instruction.

According to this configuration, even if the operation instructing process does not operate normally, damages to the data related to the control of the robot can be prevented.

Effect of the Disclosure

The present disclosure has the effect that the work of the robot can be quickly resumed after the occurrence of the abnormality.

MODES FOR CARRYING OUT THE DISCLOSURE

Hereinafter, embodiments of the present disclosure will be described with reference to the drawings. Note that the present disclosure is not limited by the embodiments. Moreover, in the following, throughout the figures, the same or corresponding components are assigned with the referential characters to omit redundant description.

Embodiment 1

Figure 1:
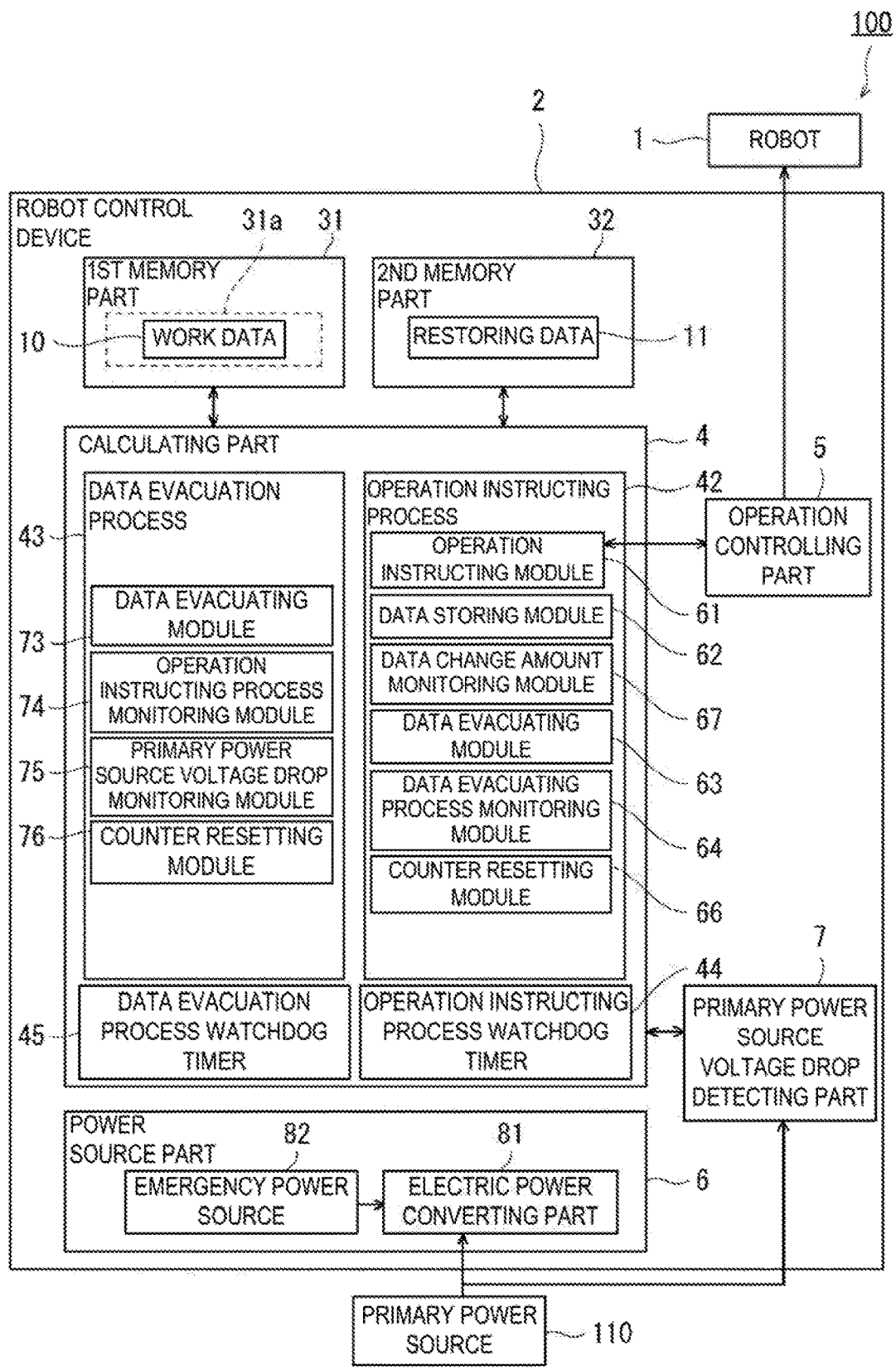
FIG. 1 is a block diagram schematically illustrating one example of a configuration of a control system of a robot system according to Embodiment 1 of the present disclosure.

FIG. 1 is a block diagram schematically illustrating one example of a configuration of a control system of a robot system 100 according to Embodiment 1 of the present disclosure.

As illustrated in FIG. 1, the robot system 100 includes a robot 1 and a robot control device 2. Although the robot 1 is, for example, a robot having a vertical articulated robot arm having a plurality of axes, it is not limited to this configuration. The robot 1 receives supply of electric power from a power source part 6 described later to operate.

[Example of Configuration of Robot Control Device]

The robot control device 2 is a device which controls the robot 1. The robot control device 2 includes a storage device, a calculating part 4, an operation controlling part 5, a power source part 6, and a primary power source voltage drop detecting part 7, and is connected to the robot 1.

The storage device stores an operation program which defines operation of the robot 1. The operation program is a program for controlling operation of each axis of the robot 1. Moreover, the storage device stores various kinds of data. Further, the storage device is communicatably connected to the calculating part 4.

The storage device is comprised of a plurality of devices, and includes a first memory part 31, and a second memory part 32 which is a separate device from the first memory part 31. This storage device receives supply of electric power from the power source part 6 to operate.

The first memory part 31 is comprised of a volatile storage device of which a stored content is lost when power supply is stopped, and stores work data 10 described later for details. The first memory part 31 is a main storage device to which, for example, the calculating part 4 is directly accessible. The first memory part 31 is a device which reads and writes data at high speed, and is, for example, a DRAM or a SRAM. The first memory part 31 has a storage area 31*a* shared by the operation instructing process 42 and the data evacuation process 43, and the work data 10 is stored in this storage area 31*a*.

The second memory part 32 is comprised of a nonvolatile storage device which holds stored content even if power is not supplied, and stores restoring data 11 described later for details. The second memory part 32 is an auxiliary storage device which is connected, for example, through an interface, and the calculating part 4 is not directly accessible to the second memory part 32. The second memory part 32 is a device which reads and writes data at a lower speed than the first memory part 31, and is, for example, a flash memory.

The calculating part 4 is, for example, a processor, such as a CPU, and performs a plurality of processes. The plurality of processes include the operation instructing process 42 and the data evacuation process 43. Moreover, the calculating part 4 has a plurality of watchdog timers. These watchdog timers include operation instructing process watchdog timers 44 and data evacuation process watchdog timers 45. The calculating part 4 may be comprised of a sole controller which carries out a centralized control, or may be comprised of a plurality of controllers which collaboratively carry out a distributed control. A plurality of processes performed by the calculating part 4 are configured to be processed independently from each other so that, if a response of one of the processes is stopped, processings of other processes will not stop. The calculating part 4 receives supply of electric power from the power source part 6 to operate.

The operation instructing process 42 includes an operation instructing module 61, a data storing module 62, a data change amount monitoring module 67, a data evacuating module 63, a data evacuating process monitoring module 64, and a counter resetting module 66.

The operation instructing module 61 generates an operating instruction to the robot 1. That is, the operation instructing module 61 determines a target angular position of each axis of the robot 1 based on the operation program.

The data storing module 62 writes data related to the robot 1 in the work data 10 to store the data in the first memory part 31. The data related to the robot 1 includes preset information, information set by a user, and information generated by the robot control device 2. The preset information is, for example, robot model information. The information set by the user is, for example, an operation program (teaching program) and network setting information. The information generated by the robot control device 2 is, for example, positional information (variable information), such as an angle of each axis of the robot 1 and coordinates of a hand of the robot 1, information generated by the robot control devices 2, such as information indicative of a state of the robot 1 under operation, error history information, and operation history information. The data related to the angle of each axis of the robot 1 is, for example, outputted from an encoder provided to each axis of the robot 1 and is configured to be generated based on a signal inputted into the calculating part 4 through the operation controlling part 5. That is, the operation instructing module 61 determines a target angular position of each axis of the robot 1, and the operation controlling part 5 controls the robot 1 so that each axis of the robot 1 is brought closer to the target angular position. Thus, a displacement of the angular position of each axis is detected by the encoder, and is then inputted into the calculating part 4 through the operation controlling part 5. The data related to the displacement of the angular position of the robot 1 inputted into the calculating part 4 is processed in a given manner by the calculating part 4, and is then stored in the first memory part 31 by the data storing module 62 as the work data 10.

The data change amount monitoring module 67 monitors an amount of data change made to the work data 10. In the embodiment, the data change amount monitoring module 67 does not monitor the contents of data.

The data evacuating module 63 coincides the restoring data 11 stored in the second memory part 32 with the work data 10 stored in the first memory part 31. That is, the work data 10 is treated as the original, and the restoring data 11 is treated as a copy. When the data evacuating module 63 coincides the restoring data 11 with the work data 10, the data evacuating module 63 compares the work data 10 with the restoring data 11, and data may be added or rewrite for the different portions of the restoring data 11. However, alternatively, the entire data of the restoring data 11 may be overwritten by the data related to the work data 10.

The data evacuating process monitoring module 64 determines whether the data evacuation process 43 operates normally. That is, when the data evacuation process watchdog timer 45 outputs a time-over signal, i.e., when an output of a counter reset signal of the data evacuation process 43 is suspended, the data evacuating process monitoring module 64 determines that the data evacuation process 43 does not operate normally (described later for details).

When the operation instructing process 42 operates in a normal state, the counter resetting module (a first normal operation signal outputting module) 66 outputs a counter reset signal (a first normal operation signal) at a second cycle time which is less than a given first cycle time to the operation instructing process watchdog timer 44. On the other hand, when the operation instructing process 42 becomes abnormal and the processing is stopped, the output of the counter reset signal of the operation instructing process 42 is also suspended.

The data evacuation process 43 includes a data evacuating module 73, an operation instructing process monitoring module 74, a primary power source voltage drop monitoring module 75, and a counter resetting module 76.

Since the data evacuating module 73 of the data evacuation process 43 is similar in the configuration to the data evacuating module 63 of the operation instructing process 42, the detailed description thereof is omitted.

The operation instructing process monitoring module 74 determines whether the operation instructing process 42 operates normally. That is, when the operation instructing process watchdog timer 44 outputs the time-over signal, i.e., when the output of the counter reset signal of the operation instructing process 42 is suspended, the operation instructing process monitoring module 74 determines that the operation instructing process 42 does not operate normally (described later for details).

The primary power source voltage drop monitoring module 75 monitors a drop of voltage of the primary power source 110 applied to the robot system 100 by using a voltage drop detection signal outputted from the primary power source voltage drop detecting part 7.

When the data evacuation process 43 operates in a normal state, the counter resetting module 76 (a second normal operation signal outputting module) outputs a counter reset signal (a second normal operation signal) at a fourth cycle time which is less than a given third cycle time to the data evacuation process watchdog timer 45. On the other hand, when the data evacuation process 43 becomes abnormal and the processing is stopped, the output of the counter reset signal of the data evacuation process 43 is also suspended.

The operation instructing process watchdog timer 44 is a watchdog timer (WDT) which outputs the time-over signal, when the counter reset signal is not inputted within the given first cycle time. The data evacuation process watchdog timer 45 is a watchdog timer (WDT) which outputs the time-over signal, when the counter reset signal is not inputted within the given third cycle time. In the embodiment, although the operation instructing process watchdog timer 44 and the data evacuation process watchdog timer 45 are comprised of software watchdog timers, they may instead be comprised of hardware watchdog timers.

These functional parts 61-64, 66, 67, 73-76, 44, and 45 are functional blocks implemented by the calculating part 4 executing a given control program stored in the storage device (the first memory part 31 and/or the second memory part 32).

The operation controlling part 5 controls operation of the robot 1 based on the operating instruction of the operation instructing module 61. The operation controlling part 5 includes, for example, a servo driver, and controls operation of a servo motor which drives each axis of the robot 1 based on the operating instruction generated by the operation instructing module 61. The operation controlling part 5 is communicatably connected to the calculating part 4. Moreover, the operation controlling part 5 receives supply of electric power from the power source part 6 to operate.

The power source part 6 includes an electric power converting part 81 and an emergency power source 82.

The electric power converting part 81 converts the electric power of the primary power source 110 inputted into the robot control device 2, and supplies it into the robot control device 2, i.e., to the storage device, the operation controlling part 5, and the calculating part 4. The electric power converting part 81 converts, for example, AC power source supplied as a primary power source 110 from the exterior into DC power source, and supplies DC power source of 16V or 25V into the robot control device 2. Moreover, the electric power converting part 81 supplies DC power source of, for example, 200V to the robot 1.

The emergency power source 82 supplies electric power to the electric power converting part 81. The emergency power source 82 is, for example, a capacitor, and supplies electric power to the electric power converting part 81 of the robot control device 2, after the supply of the electric power from the primary power source 110 is stopped, until the calculating part 4 finishes data evacuation processing described later. The emergency power source 82 is configured to supply the electric power to the electric power converting part 81, for example, for 350 milliseconds. Since the emergency power source 82 is a capacitor, it can be simplified in the configuration, is advantageous for manufacturing thereof, and is less in the manufacturing cost, compared with, for example, an uninterruptible power supply (UPS) using a rechargeable battery. Note that the emergency power source 82 is not limited to the capacitor, and may be, for example, the uninterruptible power supply.

The primary power source voltage drop detecting part 7 detects that the voltage of the primary power source 110 becomes below a given voltage, and outputs the voltage drop detection signal. The primary power source voltage drop detecting part 7 is communicatably connected to the calculating part 4.

[Example of Operation]

Next, one example of operation of the robot system 100 is described.

<Normal Data Evacuating Operation>

Figure 2:
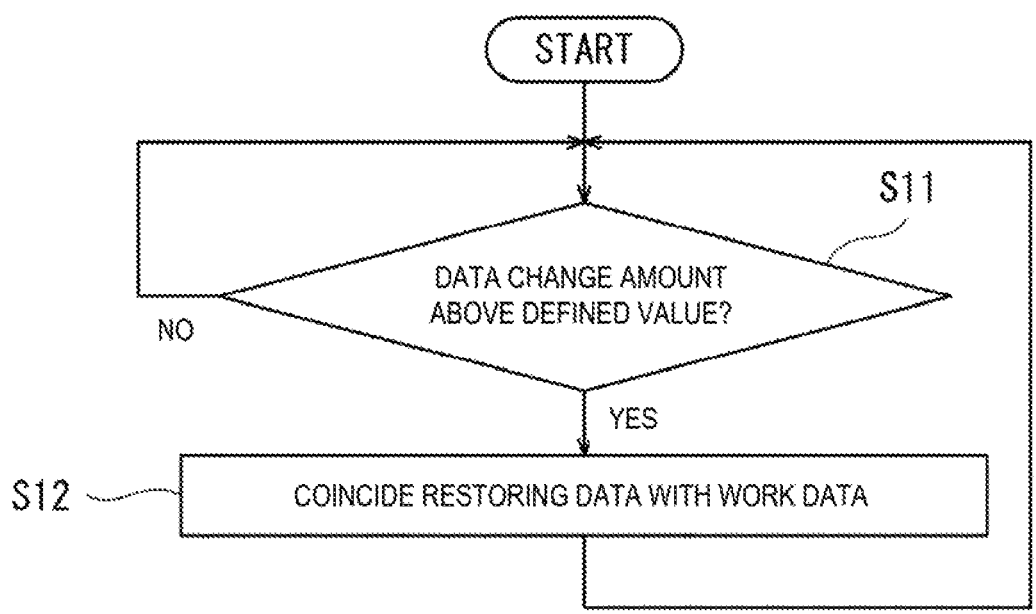
FIG. 2 is a flowchart illustrating one example of operation of the robot system in FIG. 1, and is a view illustrating a normal evacuating operation of work data.

FIG. 2 is a flowchart illustrating one example of operation of the robot system 100, and is a view illustrating a normal evacuating operation of the work data 10.

First, the normal data evacuation processing is described. The calculating part 4 reads the operation program stored in the storage device, and executes the operation program to perform the operation instructing process 42 and the data evacuation process 43. Then, the operation instructing module 61 of the operation instructing process 42 generates the operating instruction to the robot 1. Then, the operation controlling part 5 controls operation of the robot 1 based on the operating instruction generated by the operation instructing module 61. Then, in association with the operation of the robot 1, the encoder provided to each axis of the robot 1 outputs the signal related to the angle of the corresponding axis. Then, the calculating part 4 generates positional information of the robot 1 based on the signal concerned.

Next, the data storing module 62 of the operation instructing process 42 writes data related to the robot 1 including data related to an operating state of the robot 1 into the work data 10, and stores it in the first memory part 31. Then, the data evacuating module 63 of the operation instructing process 42 stores in the second memory part 32 the work data 10 as the restoring data 11.

Next, the data change amount monitoring module 67 monitors the amount of change in the data made to the work data 10. Then, as illustrated in FIG. 2, the data change amount monitoring module 67 determines whether the amount of change in the data made to the work data 10 exceeded a predefined amount of change (Step S11), and waits until the amount of change in the data made to the work data 10 exceeds the predefined amount of change. This determination processing is performed at a given cycle time. When the data change amount monitoring module 67 determines that the amount of change in the data made to the work data 10 exceeds the predefined amount of change (Yes at Step S11), the data evacuating module 63 coincides the restoring data 11 stored in the second memory part 32 with the work data 10 stored in the first memory part 31 (Step S12). Then, the processing according to Step S11 described above is again performed.

Therefore, even if the work data 10 stored in the first memory part 31 is lost in an emergency situation, damages to the data related to the control of the robot 1 including the data related to the operating state of the robot 1 can be prevented. Moreover, the data evacuating module 63 is configured to compare the work data 10 with the restoring data 11, and add the different portion to correct the data. Since the processing to add and correct for the different portion is performed, without rewriting the entire restoring data 11, the time required for the data evacuation processing can be shortened.

<Data Evacuating Operation when Operation Instructing Process is Abnormal>

Figure 3:
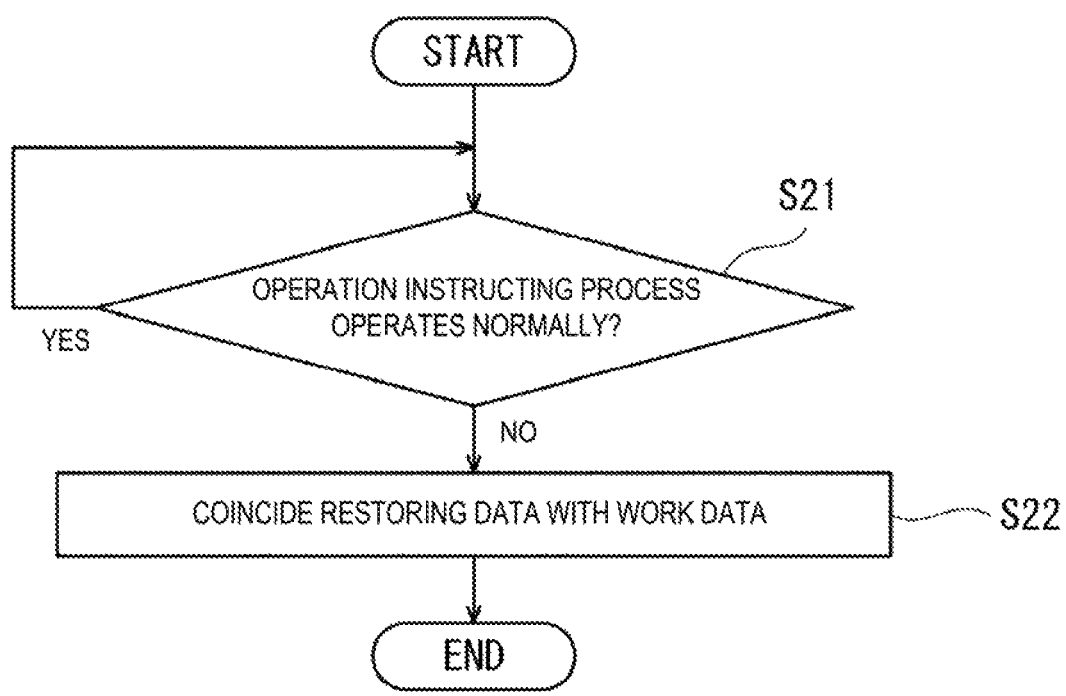
FIG. 3 is a flowchart illustrating one example of the operation of the robot system in FIG. 1, and is a view illustrating a data evacuating operation when an operation instructing process is abnormal.

FIG. 3 is a flowchart illustrating one example of operation of the robot system 100, and is a view illustrating the data evacuating operation when the operation instructing process 42 becomes abnormal.

First, as illustrated in FIG. 3, the operation instructing process monitoring module 74 of the data evacuation process 43 performed by the calculating part 4 determines whether the operation instructing process 42 operates normally (Step S21).

That is, while the operation instructing process 42 is performed normally, the counter resetting module 66 outputs the counter reset signal at the second cycle time to the operation instructing process watchdog timer 44. Thus, the time-over signal is not outputted from the operation instructing process watchdog timer 44, and therefore, the operation instructing process monitoring module 74 of the data evacuation process 43 determines that the operation instructing process 42 operates normally (Yes at Step S21). This determination processing is repeatedly performed at the given cycle time.

On the other hand, when the operation instructing process 42 becomes abnormal and the processing of the operation instructing process 42 is stopped, the output of the counter reset signal from the counter resetting module 66 of the operation instructing process 42 stops. Then, when the first cycle time is lapsed, the operation instructing process watchdog timer 44 outputs the time-over signal. Thus, the operation instructing process monitoring module 74 determines that the operation instructing process 42 does not operate normally (the operation instructing process 42 becomes abnormal) (No at Step S21), and the data evacuating module 73 of the data evacuation process 43 coincides the restoring data 11 stored in the second memory part 32 with the work data 10 stored in the first memory part 31 (Step S22). Since the work data 10 is stored in the storage area 31*a* shared by the operation instructing process 42 and the data evacuation process 43 as described above, the above-described evacuation processing can be performed by the data evacuation process 43.

Thus, even if the operation instructing process 42 does not operate normally, damages to the data related to the control of the robot 1 including the data related to the operating state of the robot 1 can be prevented. Therefore, after carrying out the emergency stop of the robot system 100, the robot system 100 can be restored promptly and the work of the robot 1 can be resumed quickly.

Note that the operation of the robot 1 may be suspended before and after the processing according to Step S22.

<Data Evacuating Operation when Data Evacuation Process is Abnormal>

Figure 4:
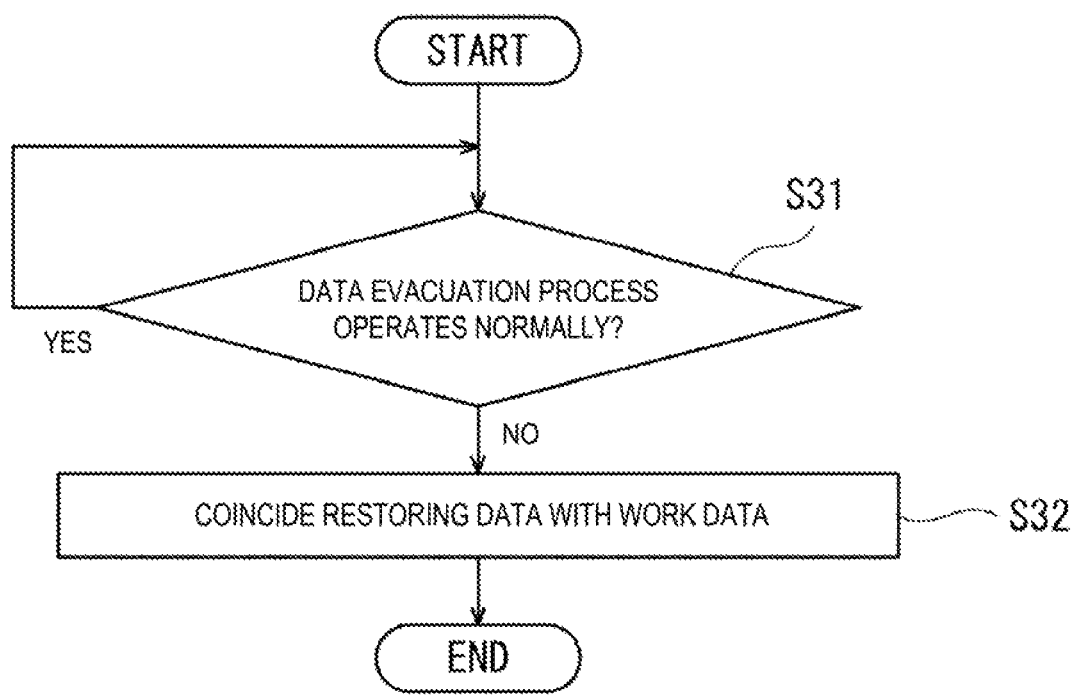
FIG. 4 is a flowchart illustrating one example of the operation of the robot system in FIG. 1, and is a view illustrating a data evacuating operation when a data evacuation process is abnormal.

FIG. 4 is a flowchart illustrating one example of operation of the robot system 100, and is a view illustrating the data evacuating operation when the data evacuation process 43 becomes abnormal.

First, as illustrated in FIG. 4, the data evacuating process monitoring module 64 of the operation instructing process 42 performed by the calculating part 4 determines whether the data evacuation process 43 operates normally (Step S31).

That is, while the data evacuation process 43 is performed normally, the counter resetting module 76 outputs the counter reset signal at the fourth cycle time to the data evacuation process watchdog timer 45. Thus, the time-over signal is not outputted from data evacuation process watchdog timer 45, and therefore, the data evacuating process monitoring module 64 of the operation instructing process 42 determines that the data evacuation process 43 operates normally (Yes at Step S31). This determination processing is repeatedly performed at the given cycle time.

On the other hand, when the data evacuation process 43 becomes abnormal and the processing of the data evacuation process 43 is stopped, the output of the counter reset signal from the counter resetting module 76 of the data evacuation process 43 stops. Then, when the third cycle time is lapsed, the data evacuation process watchdog timer 45 outputs the time-over signal. Thus, the data evacuating process monitoring module 64 determines that the data evacuation process 43 does not operate normally (the data evacuation process 43 becomes abnormal) (No at Step S31), and the data evacuating module 63 of the operation instructing process 42 coincides the restoring data 11 stored in the second memory part 32 with the work data 10 stored in the first memory part 31 (Step S32).

Thus, since the operation instructing process 42 and the data evacuation process 43 are configured to monitor mutually whether the operating state is normal, damages of the data related to the control of the robot 1 including the data related to the operating state of the robot 1 resulted from the data evacuation process 43 and also the operation instructing process 42 thereafter becoming abnormal, can be prevented before any damages happen.

Note that the operation of the robot 1 may be stopped before and after the processing according to Step S32.

<Data Evacuating Operation when Primary Power Source Voltage is Dropped>

Figure 5:
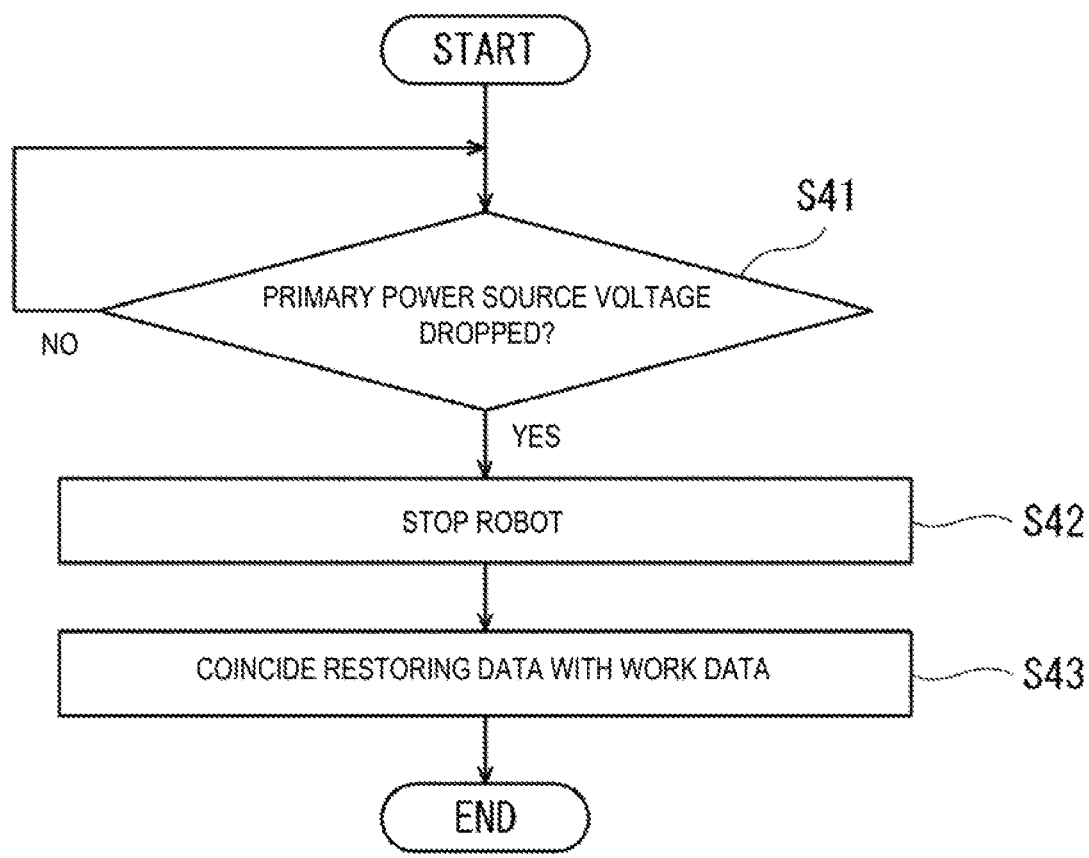
FIG. 5 is a flowchart illustrating one example of the operation of the robot system in FIG. 1, and is a view illustrating a data evacuating operation when the voltage of a primary power source is dropped.

FIG. 5 is a flowchart illustrating one example of operation of the robot system 100, and is a view illustrating the data evacuating operation when the voltage of the primary power source 110 is dropped.

First, as illustrated in FIG. 5, the primary power source voltage drop monitoring module 75 of the data evacuation process 43 determines whether the voltage of the primary power source 110 is below a given voltage (Step S41).

That is, when the voltage of the primary power source 110 is maintained above the given voltage, the primary power source voltage drop detecting part 7 does not output the voltage drop detection signal. The primary power source voltage drop monitoring module 75 determines that the voltage of the primary power source 110 is not below the given voltage in the state where the voltage drop detection signal is not outputted from the primary power source voltage drop detecting part 7 (No at Step S41). This determination processing is performed at the given cycle time.

On the other hand, when the voltage of the primary power source 110 falls and becomes below the given voltage due to the abnormality of the primary power source 110 or a plug being unintentionally unplugged from an electric outlet or socket, the primary power source voltage drop detecting part 7 outputs the voltage drop detection signal, and the power source part 6 switches the supply of electric power to the robot system 100 from the primary power source 110 to the emergency power source 82. Thus, it can be prevented that the supply of electric power to the robot control device 2 is stopped and the data related to the control of the robot 1 including the data related to the operating state of the robot 1 is damaged. Moreover, simultaneously to the switching of the power source described above, the primary power source voltage drop monitoring module 75 of the data evacuation process 43 determines that the voltage of the primary power source 110 is below the given voltage (Yes at Step S41).

Next, the calculating part 4 suspends the robot 1 (Step S42). Therefore, the consumption of electric power can be reduced.

Next, the data evacuating module 73 of the data evacuation process 43 coincides the restoring data 11 stored in the second memory part 32 with the work data 10 stored in the first memory part 31 (Step S43).

Thus, even when the voltage of the primary power source 110 falls and sufficient electric power for operating the robot control device 2 cannot be obtained from the primary power source 110, damages to the data related to the control of the robot 1 including the data related to the operating state of the robot 1 can be prevented. Therefore, after carrying out the emergency stop of the robot system 100, the robot system 100 can be restored promptly.

Moreover, the data evacuating module 63 is configured to compare the work data 10 with the restoring data 11 and add the different portion to correct the data. Therefore, rather than rewriting the entire restoring data 11, after the data is evacuated by the normal data evacuating operation described above, the processing to add and correct is performed for the data obtained by the change being made to the work data 10, and thereby, the time required for the data evacuation processing can be shortened and the capacity of the emergency power source 82 can be reduced.

As described above, since the robot system 100 of the present disclosure performs the processing to coincide the work data 10 stored in the first memory part 31 with the second memory part 32, i.e., the processing of the data evacuation process 43 to evacuate the work data 10 to the second memory part 32, even if the operation instructing process 42 does not operate normally, damages to the data related to the control of the robot 1 including the data related to the operating state of the robot 1 can be prevented. Therefore, when restoring the robot system 100, the robot system 100 can be promptly restored using the data related to the control of the robot 1 including the data related to operating state of the robot 1 stored in the second memory part 32. Then, the work of the robot 1 can be resumed quickly. Moreover, even if the user has not saved a backup of the data stored in the first memory part 31, the operation of the robot 1 can be resumed. Further, after the work of the robot 1, it becomes unnecessary to perform the work in which the user saves the backup of data in order to prevent the damages to the data of the robot 1 before the shutdown of the power source, and handling of the robot system 100 becomes easier.

Moreover, since the operation instructing process 42 and the data evacuation process 43 are configured to monitor mutually whether the operating state is normal, damages of the data related to the control of the robot 1 including the data related to the operating state of the robot 1 resulted from the data evacuation process 43 and also the operation instructing process 42 thereafter becoming abnormal, can be prevented before any damages happen.

Further, since the processing for evacuating the work data 10 to the second memory part 32 can be performed even if a problem occurs in the supply of electric power due to a power failure etc., damages to the data related to the control of the robot 1 including the data related to the operating state of the robot 1 can be prevented.

Embodiment 2

In Embodiment 1 described above, the primary power source voltage drop monitoring module 75 of the data evacuation process 43 detects that the voltage of the primary power source 110 supplied to the robot system 100 becomes below the given voltage.

Figure 6:
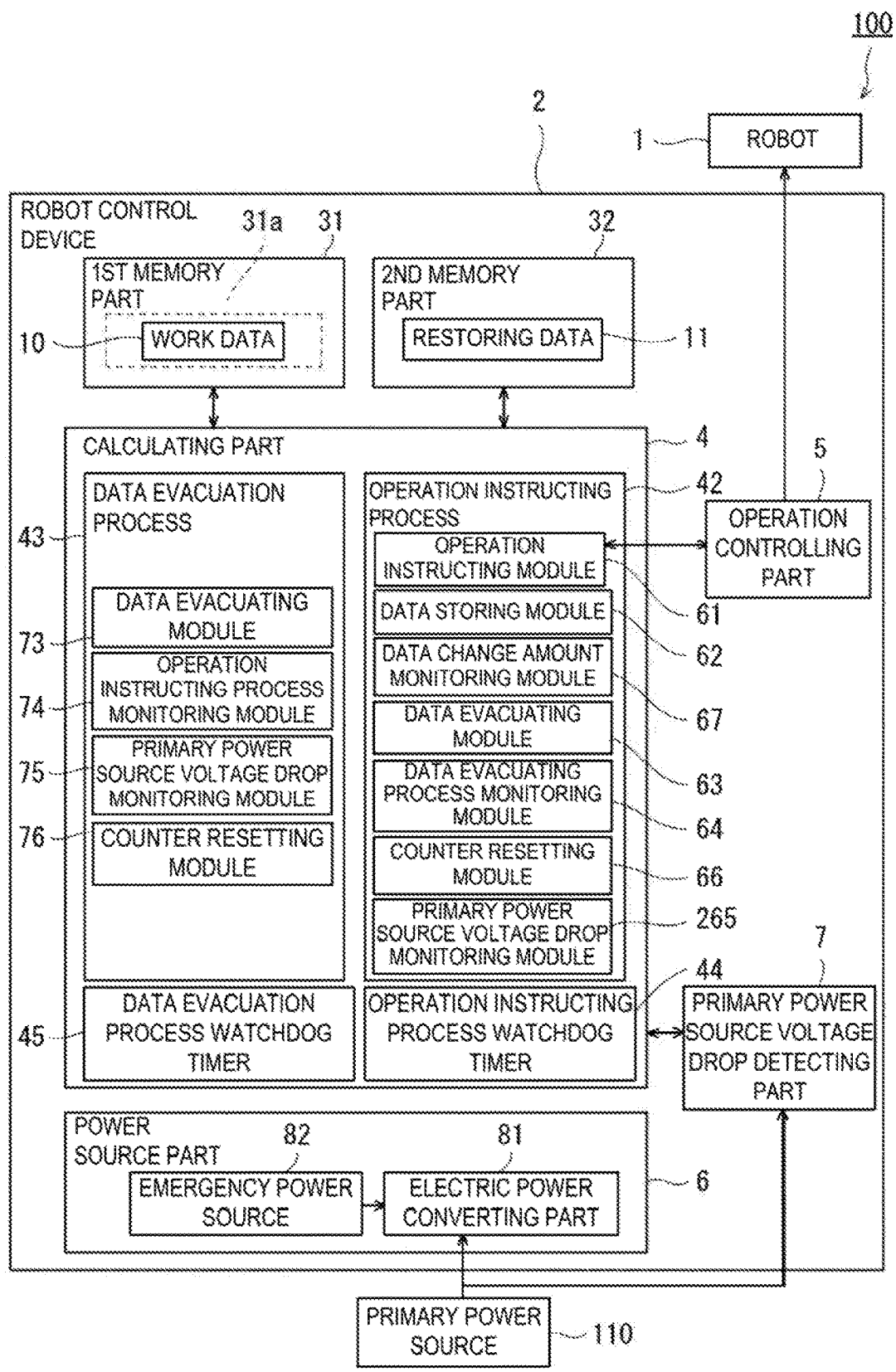
FIG. 6 is a block diagram schematically illustrating one example of a configuration of a control system of a robot system according to Embodiment 2 of the present disclosure.

On the other hand, in this embodiment, as illustrated in FIG. 6, the operation instructing process 42 may be further provided with a primary power source voltage drop monitoring module 265, and this primary power source voltage drop monitoring module 265 of the operation instructing process 42 may detect that the voltage of the primary power source 110 supplied to the robot system 100 becomes below the given voltage.

Embodiment 3

In Embodiment 1 described above, the data change amount monitoring module 67 is configured to be included in the operation instructing process 42, but it is not limited to this configuration. Alternatively, the data change amount monitoring module 67 may be included in the data evacuation process 43.

Embodiment 4

In Embodiment 1 described above, although one of the operation instructing process 42 and the data evacuation process 43 determines using the watchdog timer whether the other process operates normally, it is not limited to this configuration.

Alternatively, one of the operation instructing process 42 and the data evacuation process 43 may inquire a computer operating system to determine whether the other process operates normally. That is, for example, if the computer operating system is Linux®, process information under execution can be acquired using a ps command, and by executing the ps command at a given cycle time, a target process may be monitored whether the target process operates normally.

Alternatively, one of the operation instructing process 42 and the data evacuation process 43 may directly inquire using a socket communication whether the other process operates normally.

Further, when the process becomes abnormal, one of the operation instructing process 42 and the data evacuation process 43 may output a signal reporting that the process becomes abnormal, and when the other process receives the signal reporting that the process becomes abnormal, the other process may determine that the one process becomes abnormal (the one process does not operate normally).

Embodiment 5

In Embodiment 1 described above, when the process becomes abnormal and the voltage of the primary power source 110 falls, although the data stored in the first memory part 31 is evacuated to the second memory part 32, it is not limited to this configuration. Alternatively or additionally, at least any one of when it is detected that the temperature of the calculating part 4 etc. of the robot control device 2 becomes abnormal, when an NMI (Non-Maskable Interrupt)

occurs, and when a hardware failure is detected, the evacuation of the data may be performed.

It is apparent for a person skilled in the art from the above description that many improvements and other embodiments of the present disclosure are possible. Therefore, the above description is to be interpreted only as illustration, and it is provided in order to teach a person skilled in the art the best mode that implements the present disclosure. The details of the structures and/or the functions may be altered substantially without departing from the spirit of the present disclosure.

DESCRIPTION OF REFERENCE CHARACTERS

1 Robot
2 Robot Control Device
4 Calculating Part
5 Operation Controlling Part
10 Work Data
11 Restoring Data
31 First Memory Part
32 Second Memory Part
42 Operation Instructing Process
43 Data Evacuation Process
61 Operation Instructing Module
62 Data Storing Module
63 Data Evacuating Module
73 Data Evacuating Module
74 Operation Instructing Process Monitoring Module
100 Robot System

What is claimed is:

1. A robot control device configured to control a robot, comprising:
a first memory part configured to store work data;
a second memory part configured to store restoring data;
a calculating part configured to perform an operation instructing process configured to read the work data and generate an operating instruction to the robot, and a data evacuation process configured to determine whether the operation instructing process operates normally, and when the calculating part determines that the operation instructing process does not operate normally, coincide the restoring data with the work data; and
an operation controlling part configured to control operation of the robot based on the operating instruction, wherein
the operation instructing process determines whether the data evacuation process operates normally, and when the operation instructing process determines that the data evacuation process does not operate normally, the operation instructing process coincides the restoring data with the work data.

2. The robot control device of claim 1, wherein the operation instructing process includes a first normal operation signal outputting module configured to output a first normal operation signal when the operation instructing process operates normally, and suspend the output of the first normal operation signal when the operation instructing process does not operate normally, and
wherein the data evacuation process determines that the operation instructing process does not operate normally when the output of the first normal operation signal of the operation instructing process is suspended.

3. The robot control device of claim 2, wherein the first normal operation signal is a counter reset signal,
the robot control device further comprising an operation instructing process watchdog timer configured to output a time-over signal when the first normal operation signal is not inputted within a given first cycle time,
wherein the operation instructing process outputs the first normal operation signal to the operation instructing process watchdog timer at a second cycle time less than the first cycle time, and
wherein the data evacuation process determines that the operation instructing process does not operate normally when the operation instructing process watchdog timer outputs the time-over signal.

4. The robot control device of claim 1, wherein the data evacuation process inquires a computer operating system whether the operation instructing process operates normally to determine whether the operation instructing process operates normally.

5. The robot control device of claim 1, wherein the data evacuation process includes a second normal operation signal outputting module configured to output a second normal operation signal when the data evacuation process operates normally, and suspend the output of the second normal operation signal when the data evacuation process does not operate normally, and
wherein the operation instructing process determines that the data evacuation process does not operate normally when the output of the second normal operation signal of the data evacuation process is suspended.

6. The robot control device of claim 5, wherein the second normal operation signal is a counter reset signal,
the robot control device further comprising a data evacuation process watchdog timer configured to output a time-over signal when the second normal operation signal is not inputted within a given third cycle time,
wherein the data evacuation process outputs the second normal operation signal to the data evacuation process watchdog timer at a fourth cycle time less than the third cycle time, and
wherein the operation instructing process determines that the data evacuation process does not operate normally when the data evacuation process watchdog timer outputs the time-over signal.

7. The robot control device of claim 1, wherein the operation instructing process inquires the computer operating system whether the data evacuation process operates normally, to determine whether the data evacuation process operates normally.

8. The robot control device of claim 1, wherein the operation instructing process further writes an operating state of the robot in the work data to store the operating state in the first memory part.

9. The robot control device of claim 1, wherein the first memory part is a volatile medium, and the second memory part is a nonvolatile medium.

10. The robot control device of claim 9, comprising:
an electric power converting part configured to convert inputted electric power of the primary power source and supply the power to the operation controlling part and the calculating part; and
a primary power source voltage drop detecting part configured to detect that a voltage of the primary power source becomes below a given voltage,
wherein when the primary power source voltage drop detecting part detects that the voltage of the primary power source becomes below the given voltage, at least one of the operation instructing process and the data evacuation process coincides the restoring data with the work data.

11. The robot control device of claim 10, further comprising an emergency power source configured to supply electric power to the electric power converting part,
wherein when the primary power source voltage drop detecting part detects that the voltage of the primary power source becomes below the given voltage, the electric power converting part converts inputted electric power of the emergency power source, and supplies the power to the operation controlling part and the calculating part.

12. The robot control device of claim 1, wherein the work data is stored in a storage area shared by the operation instructing process and the data evacuation process.

13. A robot system comprising a robot and the robot control device of claim 1 configured to control the robot.

14. A method of controlling a robot by a robot control device, the method comprising:
using a first memory part of the robot control device to store work data;
using a second memory part of the robot control device to store restoring data;
using a calculating part of the robot control device to perform an operation instructing process configured to read the work data and generate an operating instruction to the robot, and a data evacuation process to determine whether the operation instructing process operates normally, and when the calculating part determines that the operation instructing process does not operate normally, coincide the restoring data with the work data; and
using an operation controlling part of the robot control device to control operation of the robot based on the operating instruction, wherein
the operation instructing process determines whether the data evacuation process operates normally, and when the operation instructing process determines that the data evacuation process does not operate normally, the operation instructing process coincides the restoring data with the work data.

\* \* \* \* \*